United States Patent [19]
Carley

[11] 3,945,517
[45] Mar. 23, 1976

[54] TRACTOR-MOUNTED LOGGING WINCH

[76] Inventor: Wesley B. K. Carley, 2156 Neil St., Victoria, British Columbia, Canada

[22] Filed: July 1, 1974

[21] Appl. No.: 484,400

[52] U.S. Cl. .............................. 214/85.5; 254/166
[51] Int. Cl.² ........................................... B60P 1/00
[58] Field of Search ........ 254/166, 190 R; 242/86.8, 242/86.5; 214/85.5, 523; 212/42.5; 224/42.1 H

[56] References Cited
UNITED STATES PATENTS

| | | | |
|---|---|---|---|
| 2,254,324 | 9/1941 | Stogren et al. | 254/190 R |
| 3,589,641 | 6/1971 | Lawrence | 254/190 R |
| 3,630,243 | 12/1971 | Hamilton et al. | 214/85.5 |
| 3,762,584 | 10/1973 | Peterson | 254/166 |

*Primary Examiner*—Robert J. Spar
*Assistant Examiner*—Kenneth Noland
*Attorney, Agent, or Firm*—Seed, Berry, Vernon & Baynham

[57] ABSTRACT

A bulldozer is provided with a relatively rugged or strong canopy which overlies the operator position, and a power-driven, cable-winding winch is mounted on the top of the canopy to winch or yard logs or similar materials toward the front end of the bulldozer. A fairlead and line-guiding structure are supported from the main frame of the bulldozer forward of the operator and engine.

5 Claims, 2 Drawing Figures

U.S. Patent    March 23, 1976    3,945,517

TRACTOR-MOUNTED LOGGING WINCH

BACKGROUND OF THE INVENTION

1. Field of the Invention

This invention relates to bulldozers and, more particularly, to the large bulldozers commonly used in building logging roads; and, more particularly, the invention relates to the novel concept of mounting a cable-winding winch on the top of the canopy so as to permit extension of the cable forward of the front end of the bulldozer.

2. Description of the Prior Art

In the past, it has been common to mount the winch on the rear of the bulldozer. This requires that the rear end of the bulldozer be facing in the direction of the object to which the cable extending from the winch is to be attached.

A frequent problem encountered by road building crews in new logging areas is that of removal of logs in the path ahead of the road being built or on the road itself. When new roads are being developed in a new logging area, the road building equipment must frequently travel long distances before adequate space can be found to provide a turnaround area for the vehicle. A typical example is road construction along the face of a steep hillside. On conventional road building equipment whereon the winch is located on the rear of the vehicle, the vehicle is required to reverse for a long distance along a newly constructed and relatively narrow road until it can be turned around and headed back again in reverse to reach the log. This operation is both time-consuming and dangerous to the operator of the vehicle.

SUMMARY OF THE INVENTION

It is an object of this invention to provide a bulldozer that can winch logs from in front of the vehicle.

It is another object of this invention to provide a road building bulldozer with a forwardly directed winch to remove logs and similar items from in front of the vehicle.

Basically, these objects are accomplished by providing the vehicle with a heavy-duty, load-supporting canopy that surrounds the operator's station and is adjacent the rear end of the vehicle. A winch is placed on the top of the canopy with a cable guide and fairlead supported from the forward end of a frame connected with the vehicle main frame. The main frame thus supports the majority of the load and stress imparted to the cable while pulling on logs from in front of the vehicle.

With such a winch arrangement, the cable may be secured to a log in front of the bulldozer without having to first turn the bulldozer around. The log can then be removed using the cable or a combination of the cable and the bulldozer blade, allowing the bulldozer to proceed ahead with the road building function.

DETAILED DESCRIPTION OF THE FIGURES OF THE DRAWING

Figure 1:
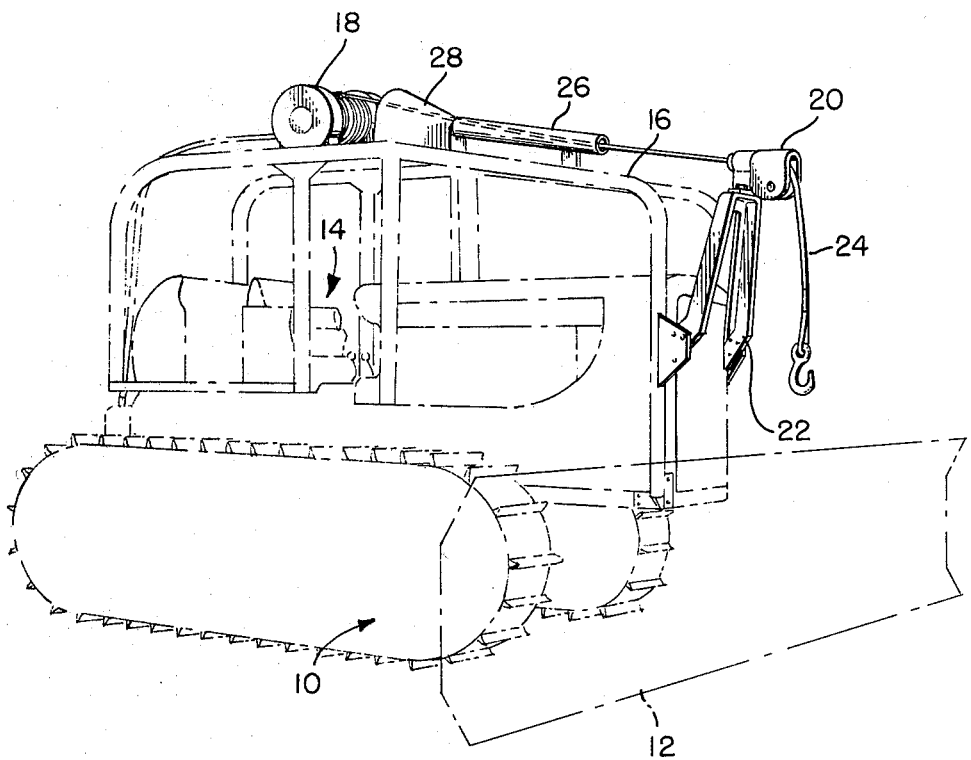
FIG. 1 is an isometric of a typical vehicle embodying the principles of the invention.
Figure 2:
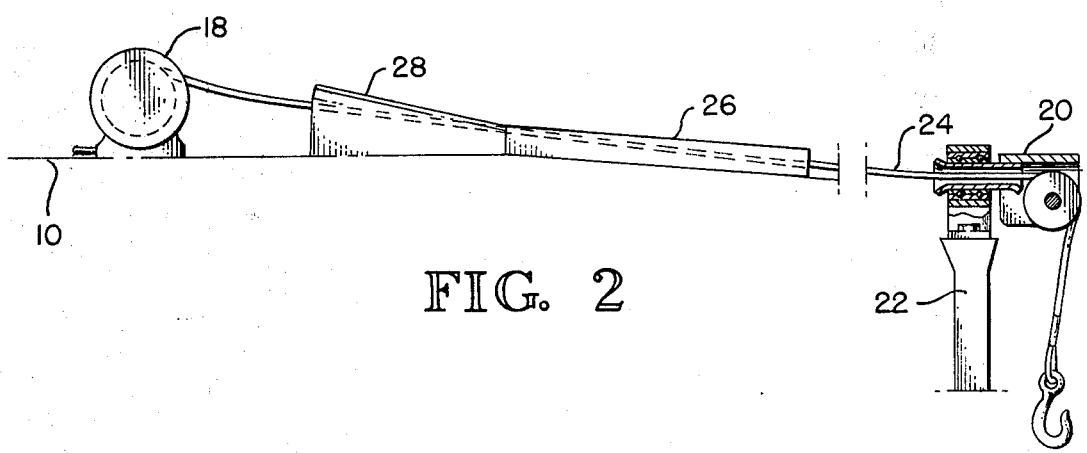
FIG. 2 is a fragmentary side elevation, partly broken away, illustrating a preferred form of winch arrangement used on the vehicle of FIG. 1.

As is best shown in FIG. 1, a vehicle, such as a bulldozer 10, is provided with a conventional blade 12 and an operator's station 14. The vehicle is also provided with a heavy-duty frame 16 capable of withstanding the weight of the vehicle in the event the vehicle is turned over and for supporting loads carried by a winch 18 mounted on top of the frame above the operator's station. The frame 16 is secured to the main frame of the vehicle.

The winch 18, although shown mounted directly above the operator's station, can also be placed forward of the operator's station on the forward end of the frame 16. Mounted on the forward end of the frame 16 is a bull's-eye fairlead 20 of a conventional design. The fairlead is carried on a pair of support brackets 22 that are rigidly secured to the frame and extend forwardly of the radiator. A cable 24 is threaded through the fairlead and through a guide tube 26 to the winch 18. The rearmost end of the guide tube 26 is provided with a rearwardly and outwardly diverging funnel 28 for guiding the cable without interfering with the movement of the cable along the cable drum.

As is readily understood, the operator can drive the vehicle up to the obstructing log and wrap the cable either directly around the log or, with the use of well-known choker cables or the like, secure the cable to the log. Then, by winching back on the cable 24, the log can be pulled out of the path of the vehicle. As is also quite apparent, the operator, when viewing forward, advantageously has a clear line of vision to assist in manipulating the log from his normal sitting position.

While the preferred embodiment of the invention has been illustrated and described, it should be understood that variations will be apparent to one skilled in the art. Accordingly, the invention is not to be limited to the specific embodiments shown in the drawing.

The embodiments of the invention in which a particular property or privilege is claimed are defined as follows:

1. A vehicle for use in road building in a logging area having an operator's station, a load-supporting frame surrounding said operator's station and extending to the forward end of the vehicle, and means for moving the vehicle along the ground, the improvement comprising a cable winding winch means mounted on said frame over the operator's station, a cable wound on and extending from said winch, and guide means mounted at the forward end of the frame for guiding the cable from forward of the vehicle to the winch, said guide means including a guide tube and a fairlead forward of the guide tube, said guide tube having a rearwardly and outwardly flared rearward end, said winch and guide means providing a structure whereby logs forward of the vehicle can be secured to the cable for removal of the logs from the path of the vehicle.

2. A bulldozer vehicle having an operator's station, a frame structure including a canopy mounted on and extending above the vehicle and a vertically movable earthmoving blade mounted on said vehicle at the forward end thereof, the improvement comprising:

a powered cable drum mounted on said vehicle;
a fairlead secured to said vehicle forward of said drum and blade at a height sufficiently above the operating position of said blade to lift large objects; and a cable wrapped on said drum and extending therefrom and passing through said fairlead to a point forward of said vehicle whereby said cable is adapted to be secured to and remove objects in front of said vehicle with said blade in operation.

3. The vehicle of claim 2 wherein said operator's station is enclosed by said canopy and said drum is mounted on the top surface thereof.

4. The vehicle of claim 3 wherein said canopy is supported by a plurality of upstanding members and said fair-lead is mounted on the center portion of a U-shaped bracket having downwardly extending ends fastened to the fowardmost of said upstanding members.

5. A bulldozer vehicle having an operator's station surrounded by a canopy, the improvement comprising:
   a powered cable drum secured to said canopy;
   a fairlead secured to said vehicle forward of said drum and operator's station;
   a cable wrapped on said drum and extending directly to said fairlead, said cable further passing through said fairlead to a point forward of said vehicle; and
   a guide tube surrounding a portion of said cable intermediate said drum and fairlead, said tube having a flared rearward end.

* * * * *